United States Patent [19]

McCoy et al.

[11] Patent Number: 5,246,097

[45] Date of Patent: Sep. 21, 1993

[54] LINE CHANGING SYSTEM FOR AIR BOTTLE CONVEYORS

[75] Inventors: Byron A. McCoy, Lynchburg; John J. Douglas, Lynch Station, both of Va.

[73] Assignee: Simplimatic Engineering Company, Lynchburg, Va.

[21] Appl. No.: 964,364

[22] Filed: Oct. 21, 1992

[51] Int. Cl.⁵ .......................................... B65G 47/46
[52] U.S. Cl. ..................... 198/448; 198/451; 406/86; 406/183
[58] Field of Search .............. 198/436, 437, 438, 442, 198/448, 449, 451, 452; 406/1, 9, 26, 86, 181, 182, 183

[56] References Cited

U.S. PATENT DOCUMENTS

| | | | |
|---|---|---|---|
| 624,202 | 5/1899 | Fordyce | 406/181 |
| 2,404,232 | 7/1946 | Hunter | 198/451 |
| 2,602,534 | 7/1952 | Hartmann | 198/437 |
| 2,678,124 | 5/1954 | Bergmann | 198/451 X |
| 2,732,263 | 1/1956 | Riordan | 406/183 |
| 2,753,475 | 7/1956 | Day et al. | 198/448 |
| 2,989,348 | 6/1961 | Reed | 406/183 X |
| 3,097,889 | 7/1963 | Lenhart | 406/183 X |
| 3,386,474 | 6/1968 | Kimmel | 137/883 |
| 3,731,823 | 5/1973 | Goth | 406/88 X |
| 3,774,863 | 11/1973 | Ekama | 406/183 |
| 3,907,374 | 9/1975 | Steele | 151/625.48 X |
| 4,070,961 | 1/1978 | O'Rourke et al. | 137/883 X |
| 4,413,935 | 11/1983 | Smith et al. | 406/181 |
| 4,506,704 | 3/1985 | Boom et al. | 137/883 |
| 4,822,214 | 4/1989 | Aidlin et al. | 406/86 |
| 4,938,636 | 7/1990 | Aidlin et al. | 406/31 |
| 4,944,635 | 7/1990 | Carlier et al. | 406/183 X |

*Primary Examiner*—Robert P. Olszewski
*Assistant Examiner*—James R. Bidwell
*Attorney, Agent, or Firm*—St. Onge Steward Johnston & Reens

[57] ABSTRACT

An intersection is provided for bottle conveyor lines having individual neck guide pairs. The intersection comprises a transfer plate and a pair of changing plates. The transfer plate includes a substantially Y-shaped opening extending to the edges thereof and comprising two arm members and a leg member defining a central plate portion and side plate portions. Each arm member when combined with the leg member forms a substantially continuously curving bottle path. The changing plates are movable, preferably vertically, between first positions in planar alignment with the transfer plate and second positions clear of bottles moving along the paths. The changing plates include an edge spanning one bottle path from opposite sides of the leg portion of the Y-shaped opening to the point of intersection of the converging edges of the central plate to complete the bottle supporting guides along the other bottle path.

24 Claims, 9 Drawing Sheets

LINE CHANGING SYSTEM FOR AIR BOTTLE CONVEYORS

FIELD OF THE INVENTION

The invention relates to a system for changing between first or second conveyors, and a third conveyor for articles such as bottles having an outwardly extending flange or neck ring. More specifically, the invention relates to a system for changing bottles between first or second conveyor lines and a third conveyor line through a substantially continuously curved intersection at speeds of up to 1100 bottles per minute (bpm) and higher.

BACKGROUND OF THE INVENTION

Recent advances in air bottle conveyors have enabled bottles and other flanged articles to be conveyed at line speeds of over 1100 bpm. Increased line speed capabilities can aggravate speed mismatch problems between the line and various pieces of handling equipment which often hamper conveyor plant efficiency and throughput. For example, overall plant throughput is generally limited by the throughput on the slowest piece of equipment. Increases in speed of washers, fillers or other pieces of equipment highlight the low throughput on slow or breakdown-prone pieces of equipment. Speed mismatches can also cause jamming and damage of articles due to accumulation at slower throughput pieces of equipment. Increased line speeds also create increased line pressure, subjecting bottles to greater downstream forces.

Speed mismatches are often accommodated by branching lines to or joining lines from slower pieces of plant equipment. However, the increased speed and forces may cause unacceptable levels of damage to bottles branched from one conveyor to another at the relatively angular intersections used in prior art devices.

Prior art bottle diverting systems, such as those disclosed in U.S. Pat. Nos. 4,822,214 (Aidlin), 4,938,636 (Aidlin) and 4,944,635 (Carlier), include two or more linear bottle conveying portions which meet in angular intersections. A wedge-shaped diverter blade is positioned at each intersection to divert bottles along one path and to block the other or unintended path. The bottle path may be switched by rotating the diverter blade.

With prior art systems, bottles are diverted from one conveyor to another by following one linear path to the angular intersection, striking and ricocheting off of the diverter blade or a side of the other linear path, and then following the other linear path away from the intersection. Although sufficient for prior bottle line speeds, these angular intersections and diverter blades disadvantageously may cause damage to bottles moving along conveyor lines at speeds of up to 1100 bpm and higher. Due to their dual functioning as accumulating stops, the diverter blades in prior art devices are subjected to increased stresses which may degrade reliability and accelerate wear.

SUMMARY OF THE INVENTION

Accordingly, it is an object of the invention to provide a system enabling reliable conveyor changing for bottles at speeds of up to 1100 bpm and higher.

It is another object of the invention to provide a bottle conveyor line changing system having a substantially continuously curving intersection between conveyor lines.

It is a further object of the invention to provide a line changing system for an air bottle conveyor which operates with improved reliability, and reduced bottle damage and mechanical wear.

It is still another object of the invention to provide a line changing system for an air bottle conveyor which comprises a transfer plate over which articles are primarily moved by line pressure.

These and other objects are achieved by provision of a bottle conveyor line intersection for conveyor lines having individual neck guide pairs and plenums. The intersection comprises a transfer plate and a pair of changing plates.

The transfer plate includes a substantially Y-shaped opening extending to the edges thereof and comprising two arm members and a leg member defining a central plate portion and side plate portions. Each arm member when combined with the leg member forms a substantially continuously curving bottle path. Edges of the side plate portions bounding the Y-shaped opening, and the converging edges of the central plate portion bounding the Y-shaped opening, support bottles beneath their neck rings as they move along the continuously curving paths between the conveyor lines.

The changing plates are movable, preferably vertically, between first positions in planar alignment with the transfer plate and second positions clear of bottles moving along the paths. The changing plates include an edge spanning one bottle path from opposite sides of the leg portion of the Y-shaped opening to the point of intersection of the converging edges of the central plate to complete the bottle supporting guides along the other bottle path.

The bottle supporting edges of the plates are preferably bevelled to match the profile of the infeed and discharge conveyor guides. This bevel will also reduce the friction between the bottle supporting edges and the bottles.

The intersection may be configured with sensors and stops to operate as a combiner or as a separator. In each case, the infeed conveyor line(s) include a stop and an air line or the like is used to clear the intersection prior to changing plate alternation.

The invention and its particular features and advantages will become more apparent from the following detailed description considered with reference to the accompanying drawings.

DETAILED DESCRIPTION OF THE INVENTION

Figure 1:
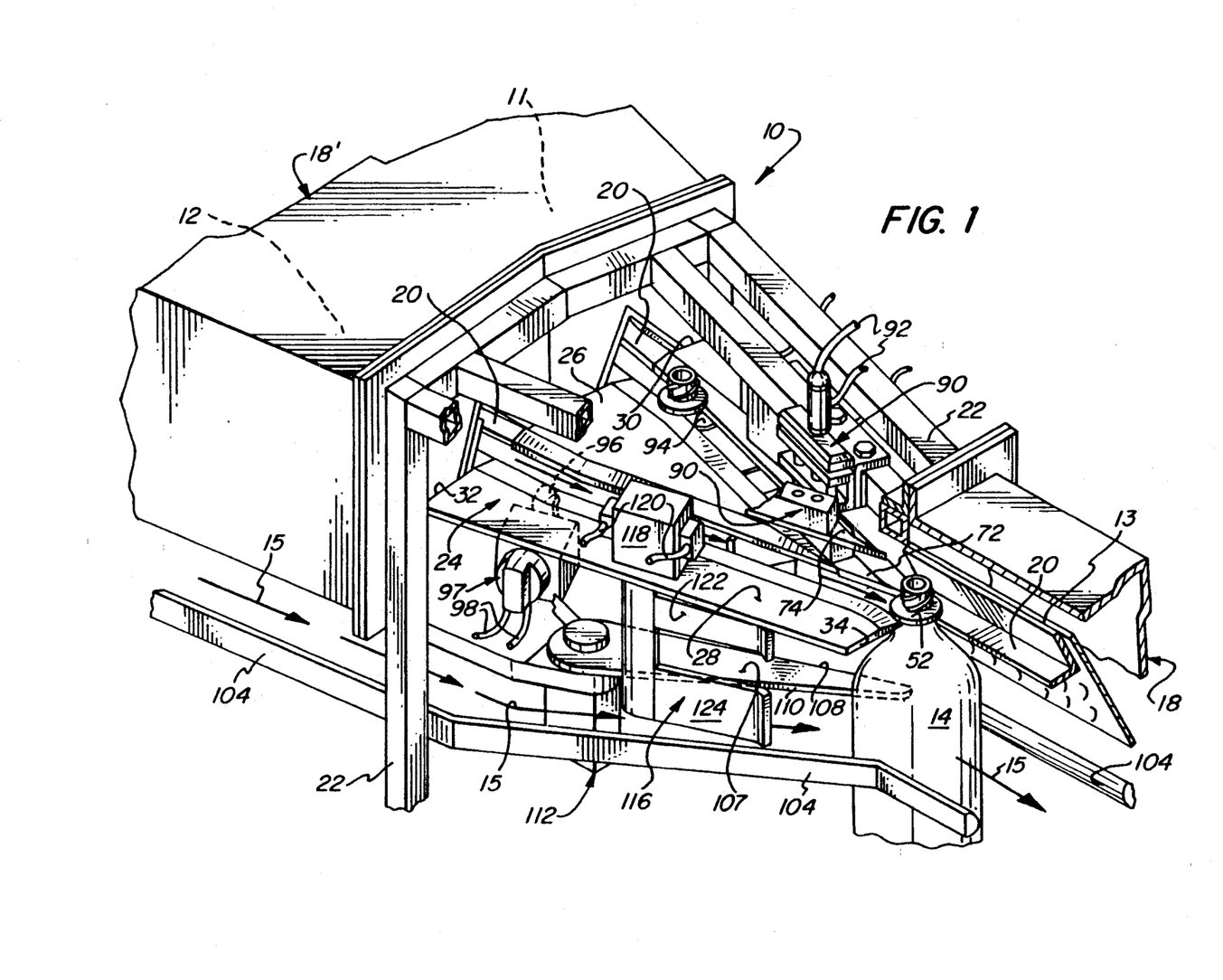
FIG. 1 is a isometric view of a bottle conveyor line changing system in accordance with the invention.
Figure 4:
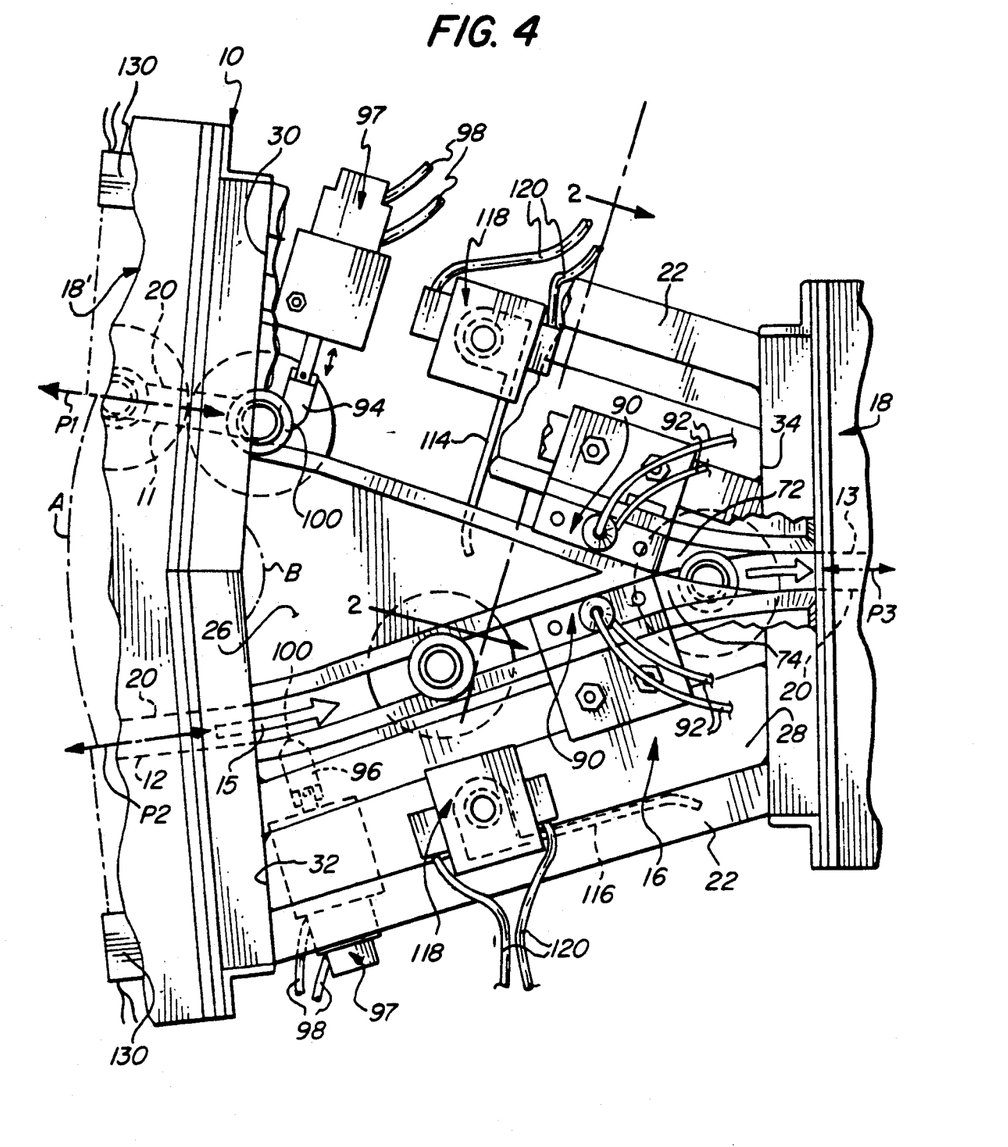
FIG. 4 is a top plan view of the line changing system of FIG. 1.

Referring to FIGS. 1 and 4, a bottle air conveyor line changing apparatus 10 is shown. Line changing apparatus 10 comprises first, second and third conveyors lines 11, 12 and 13 for conveying bottles 14, and an intersection 16 for connecting conveyor lines 11, 12, 13 together.

Conveyor lines 11, 12, 13 each include neck guide pairs 20 for supporting bottles 14 beneath their neck rings 52. Conveyor line 13 includes a plenum chamber 18 and conveyor lines 11, 12 preferably include a common plenum chamber 18' in the region of intersection 16 although individual plenums may also be used. Preferably, plenum chambers 18, 18' and neck guide pairs 20 are provided as disclosed in U.S. patent application Ser. No. 07/741,108 entitled "Bottle Air Conveyor". Most preferably, plenum chambers 18, 18' are capable of separate operation and control such that conveyor line 13 could be operated to convey bottles at nearly twice the line speed of conveyor lines 11, 12.

As discussed in more detail below, line changing apparatus 10 may be multiply configured and used as a combiner as illustrated by arrows 15 (FIGS. 1 and 4) to provide one single file line 13 of bottles from two input single file lines 11, 12 of bottles delivered to intersection 16, and as a separator (illustrated by a direction opposite to arrows 15 in FIGS. 1 and 4) to provide two single file lines 11, 12 of bottles from one input single file line 13 of bottles delivered to intersection 16. It is understood that when apparatus 10 is used as a separator, a relatively higher speed input single file line of bottles may be used to produce two relatively lower speed output single file lines, and when used as a combiner, two relatively slower single file lines may be used to produce one relatively higher speed single file line of bottles. In this regard, apparatus 10 may be used to accommodate the different throughput speeds of different pieces of plant equipment, for example palletizers, depalletizers which are generally relatively slow, and fillers, washers or the like which are generally relatively faster, in order to improve overall plant efficiency.

Referring now specifically to FIG. 4, neck guide pairs 20 on conveyor lines 11, 12 follow paths P1, P2 which are substantially straight for at least a short distance and which converge toward intersection 16 at an angle A of between about 5 degrees and 30 degrees, and preferably between about 7 degrees and 15 degrees. Neck guide pair 20 on conveyor line 13 also follows a path P3 which is substantially straight for at least a short distance and which preferably substantially bisects angle A.

Intersection 16 comprises a support frame 22 and a transfer plate 24 mounted to the frame so that a first, wider end 26 of plate 24 is aligned substantially parallel with neck guide pairs 20 of conveyor lines 11, 12 which are also mounted to frame 22, and so that a second narrower end 28 of plate 24 is aligned substantially parallel with neck guide pair 20 of conveyor line 13 which is also mounted to frame 22.

Wider end 26 of transfer plate 24 has two substantially straight edges 30, 32 which meet in angle B equal to about 180 degrees minus the magnitude of angle A. Edge 30 is substantially perpendicular to path P1 and edge 32 is substantially perpendicular to path P2. Narrower end 28 of transfer plate 24 has an edge 34 lying substantially perpendicular to path P3.

Figure 5A:
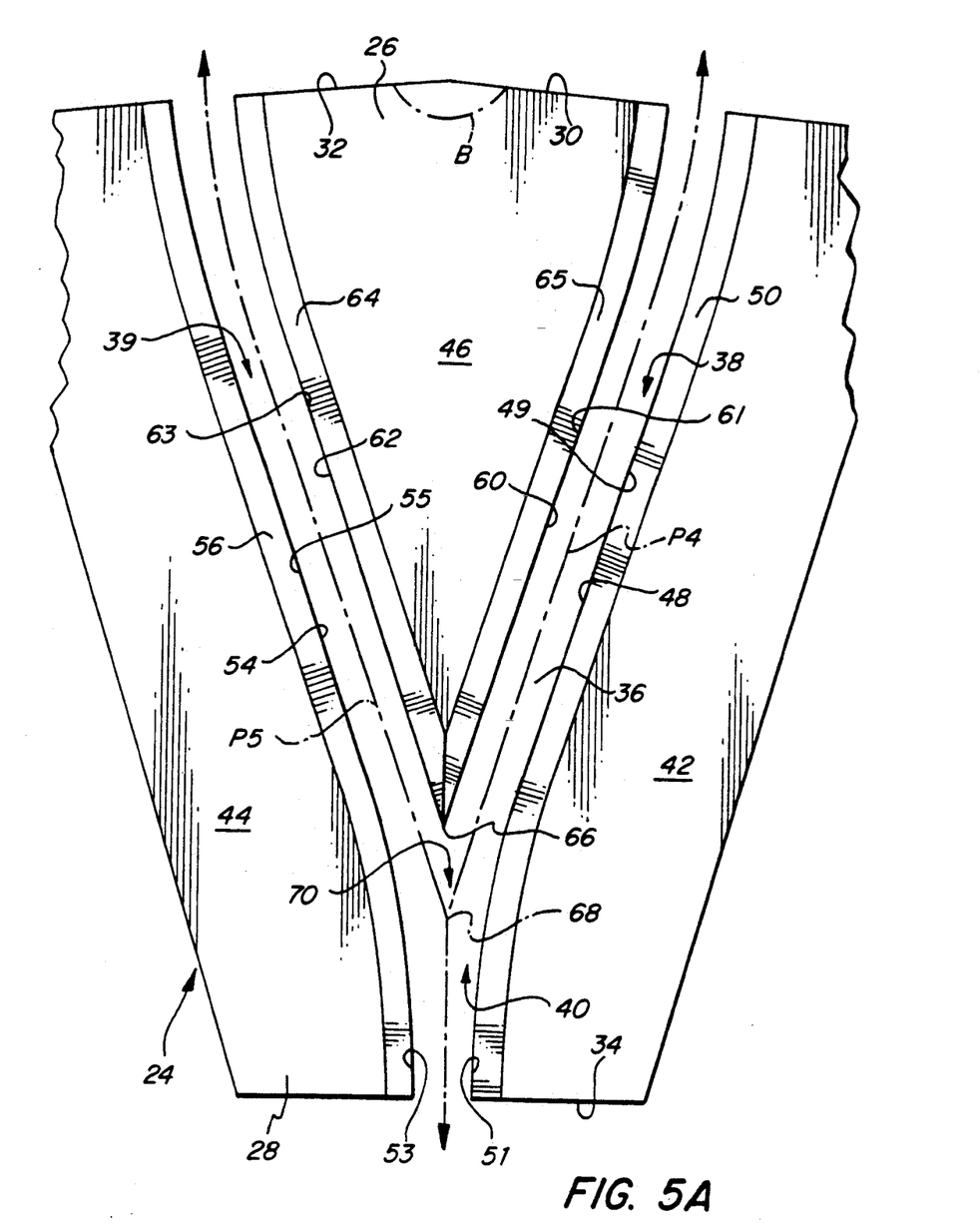
FIGS. 5A and 5B are enlarged partial top plan views of the transfer plate intersection of the line changing system of FIG. 1.

Referring to FIG. 5A, transfer plate 24 is shown in an enlarged plan view, removed from frame 22 (FIGS. 1 and 4). Transfer plate 24 includes a substantially Y-shaped opening 36 extending between edges 30, 32, 34. Y-shaped opening 36 includes arm members 38, 39 each of which intersects an edge 30, 32 and a leg member 40 which intersects edge 34 to separate transfer plate 24 into first and second side plates 42, 44 and a central plate 46.

First side plate 42 has an edge 48 bounding Y-shaped opening 36 along a side 49 of first arm member 38 and a side 51 of leg member 40. Edge 48 follows a substantially continuously curving bottle path P4 formed by arm member 38 and leg member 40 of Y-shaped opening 36. Curving bottle path P4 extends between edges 30 and 34 of transfer plate 24 to connect bottle paths P1 and P3 (FIG. 4). A portion of side plate 42 in the region of edge 48 forms a substantially continuously curving neck guide 50 for supporting bottles 14 beneath their neck rings 52 as they are moved along bottle path P4 substantially by line pressure. When, as in FIGS. 1 and 4, transfer plate 24 is mounted by frame 22 in alignment with conveyor lines 11, 12, 13, curving neck guide 50 connects together an outer one of pair 20 of neck guides in conveyor line 11 with one of pair 20 of neck guides in conveyor line 13.

Second side plate 44 has an edge 54 bounding Y-shaped opening 36 along a side 55 of second arm member 39 and a side 53 of leg member 40. Edge 54 follows a substantially continuously curving bottle path P5 formed by arm member 39 and leg member 40 of Y-shaped opening 36. Curving bottle path P5 extends between edges 32 and 34 of transfer plate 24 to connect bottle paths P2 and P3 (FIG. 4). A portion of side plate 44 in the region of edge 54 forms a substantially continuously curving neck guide 56 for supporting bottles 14 beneath their neck rings 52 as they are moved along bottle path P5 substantially by line pressure. When, as in FIGS. 1 and 4, transfer plate 24 is mounted by frame 22 in alignment with conveyor lines 11, 12, 13, curving neck guide 56 connects together an outer one of pair 20 of neck guides in conveyor line 12 with the other of pair 20 of neck guides in conveyor line 13.

Edges 48, 54 of side plates 42, 44 are preferably bevelled to reduce friction between neck guides 50, 56 and bottle neck rings 52. The bevelled edges provide a sloping bottle neck ring support surface which matches a similarly sloping surface which may be provided by neck guides 20 in conveyors 11, 12, 13.

Central plate 46 includes first and second converging edges 60, 62 which respectively bound Y-shaped opening 36 along sides 61 and 63 of arm members 38, 39, and meet in a point 66. Edge 60 lies substantially parallel to substantially continuously curving bottle path P4 and edge 62 lines substantially parallel to substantially continuously curving bottle path P5. A portion of central plate 46 in the region of edges 60, 62 form substantially continuously curving neck guides 64, 65 for supporting bottles 14 beneath their neck rings 52 as they are moved along bottle paths P4, P5 substantially by line pressure. Point 66 lies near intersection 68 of substantially continuously curving bottle paths P4 and P5.

Figure 2:
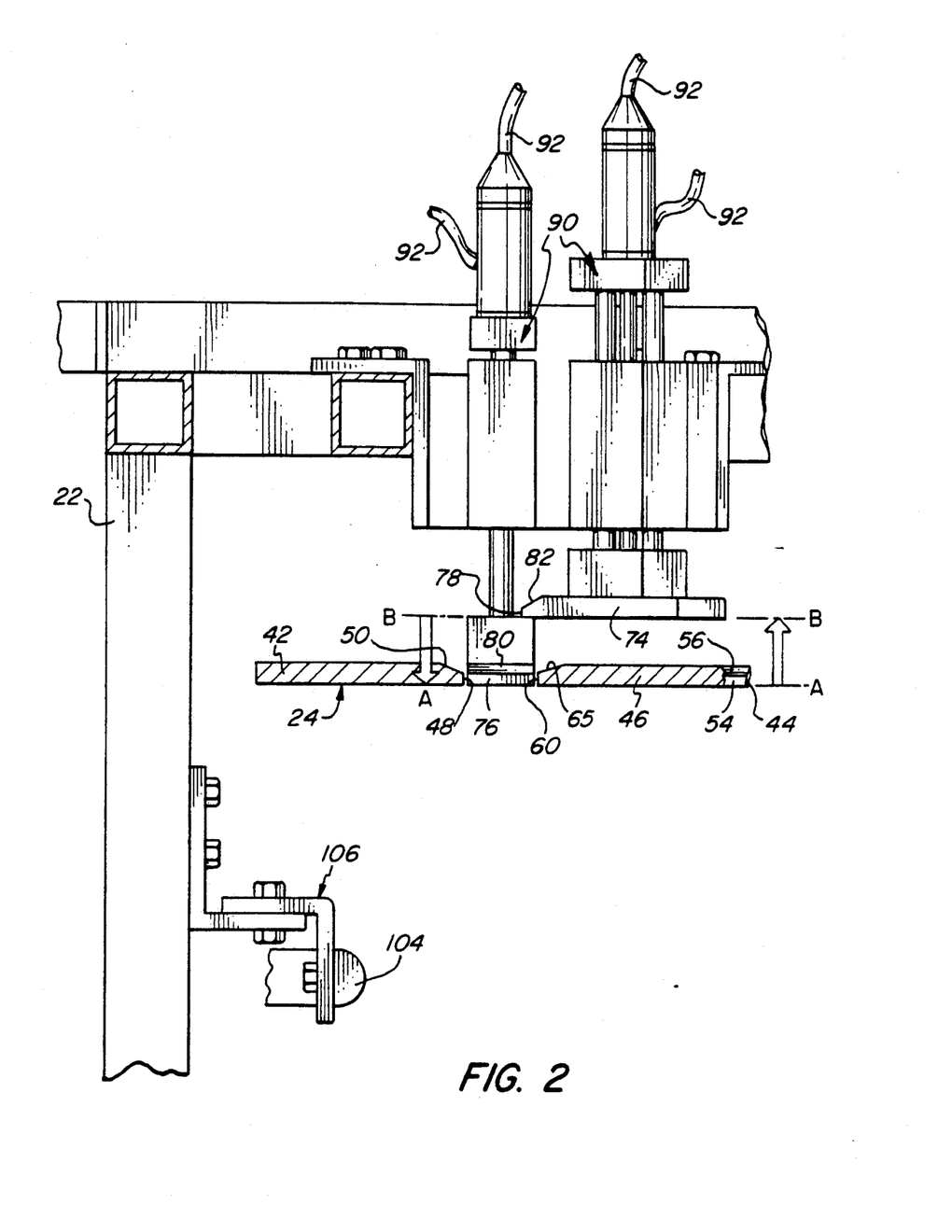
FIG. 2 is an end elevation view of the line changing system of FIG. 1.
Figure 5B:
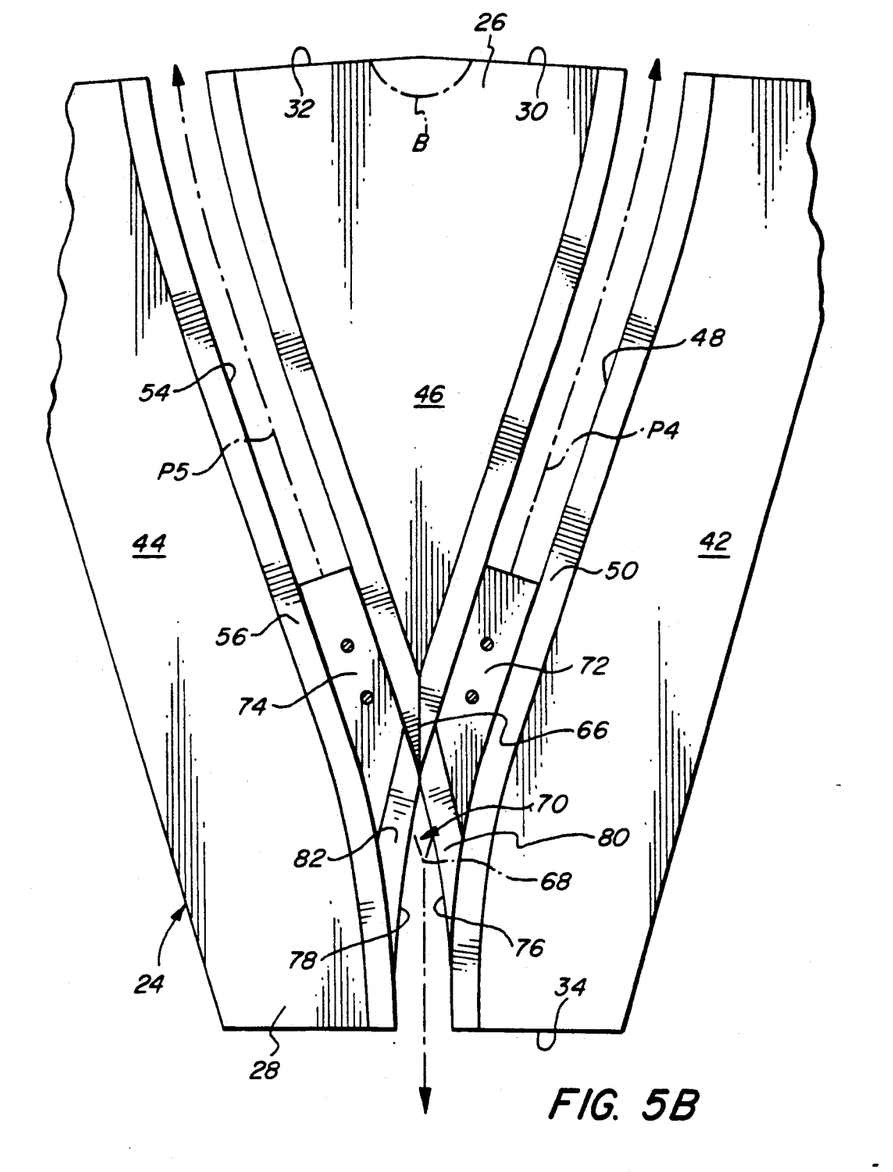

A region 70 of Y-shaped opening 36 near intersection 68 of bottle paths P4, P5 is large enough for neck rings 52 of bottles 14 to pass therethrough. Referring to FIGS. 2 and 5B, region 70 is alternately partially filled by movable transfer plate portions or changing plates 72, 74. Changing plates 72, 74 include edges 76, 78 which respectively lie substantially parallel to substantially continuously curving bottle paths P4, P5. Edges 76, 78 are preferably also substantially continuously curving. A portion of changing plates 72, 74 in the region of edges 76, 78 forms respective neck guide portions 80, 82 which support bottles 14 beneath their neck rings 52 as they are moved along bottle paths P4, P5. Neck guide portions 80, 82 each sufficiently fill opening 36 to prevent bottle neck rings 52 from falling therethrough.

Preferably, neck guide portions 80, 82 lie substantially parallel to the substantially continuously curving bottle paths, and most preferably neck guide portions 80, 82 are themselves substantially continuously curving. Further, edges 76, 78 of changing plates 72, 74 are preferably bevelled (see FIG. 2) to reduce friction between neck guide portions 80, 82 and bottle neck rings 52 and match the bevel in transfer plates 42, 44 and 46.

Neck guide portion 80 extends from neck guide 50 toward an inner one of pair 20 of neck guides in conveyor line 12. Where, as illustrated, a central plate 46 is used, edge 76 of changing plate 72 curves from edge 48 of side plate 42 to point 66 completing the neck guides for curving bottle path P5 and blocking curving bottle path P4.

Neck guide portion 82 extends from neck guide 56 toward an inner one of pair 20 of neck guides in conveyor line 11. Where, as illustrated, a central plate 46 is used, edge 78 of changing plate 74 curves from edge 54 of side plate 44 to pint 66 completing the neck guides for curving bottle path P4 and blocking curving bottle path P5.

Referring now to FIGS. 1, 2–4 and 5B, changing plates 72, 74 are each vertically or otherwise moveable, between a first position A substantially in planar alignment with transfer plate 24 (plate 72 in FIGS. 1–4) and a second position B clear of bottles 14 conveyed along curving bottle paths P4, P5 (plate 74 in FIGS. 1–4). Changing plates 72, 74 are moved between the first and second positions by actuators such as rod and cylinder assemblies 90 or the like which may be controlled manually, or automatically with a controller (not shown in any FIG.), through fluid lines 92.

With plate 74 in position B and plate 72 in position A as illustrated, bottles 14 are free to move across transfer plate 24 along curving bottle path P5 between conveyor lines 12 and 13. With plate 74 in position A and plate 72 in position B (not shown in any FIG.), bottles are free to move across transfer plate 24 along curving bottle path P4 between conveyor lines. Bottles are moved across transfer plate 24 substantially completely by line pressure and no plenum chamber is used over intersection 16 in order to prevent lubricants, frictional contaminants and the like from the moving parts at the intersection from being blown into the bottles. The substantially continuously curving bottle paths P4, P5 of transfer plate intersection 24 permit relatively rapid bottle throughput without bottle damage which might result from similar throughput levels on prior art devices.

Figures 6A, 6B:
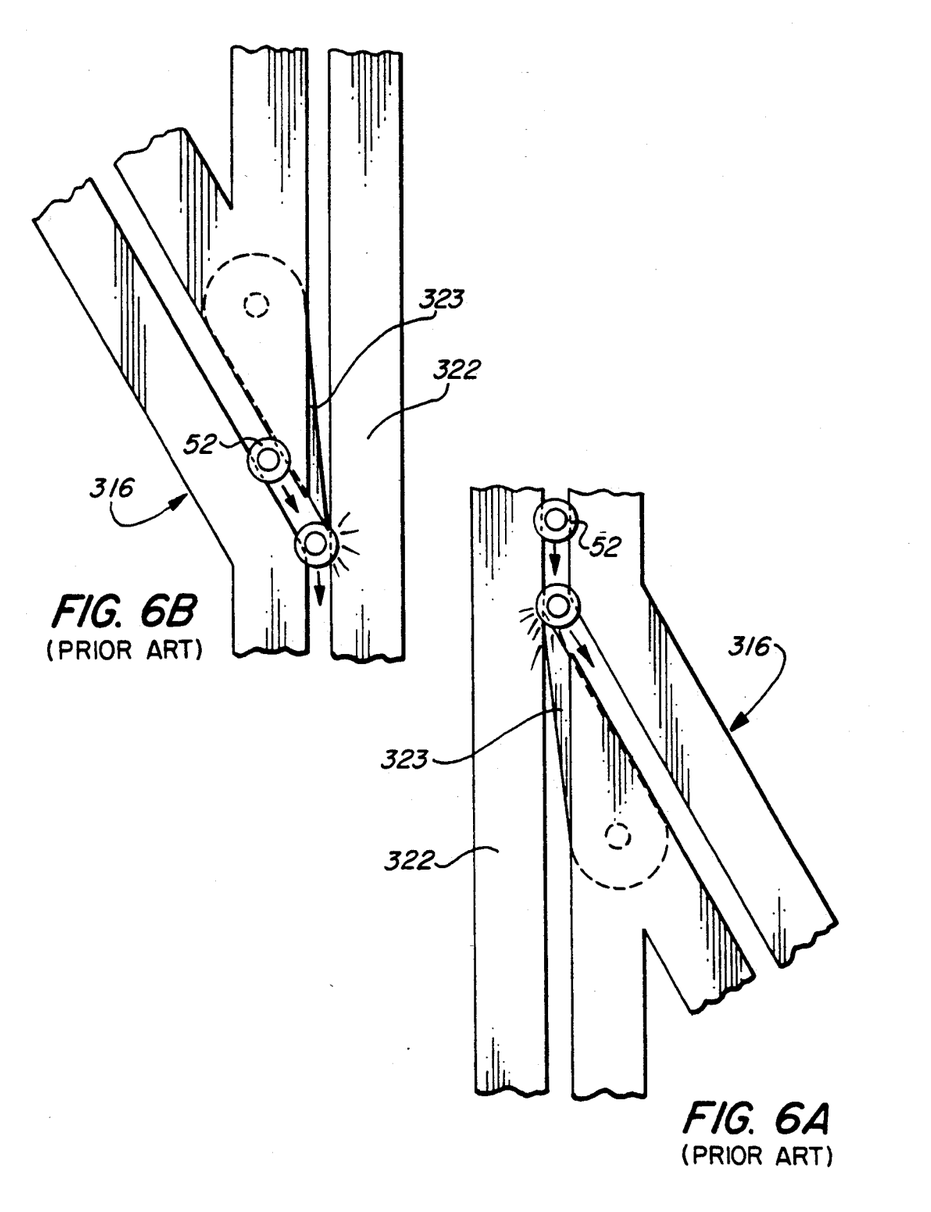
FIGS. 6A and 6B are enlarged partial top plan views of prior art bottle diverters with the unitary plenum chamber removed.

FIGS. 6A and 6B are top plan views of prior art intersections 316 which illustrate the disadvantageous collisions with and deflections from neck guides 322 and diverter blades 323.

Figure 3:
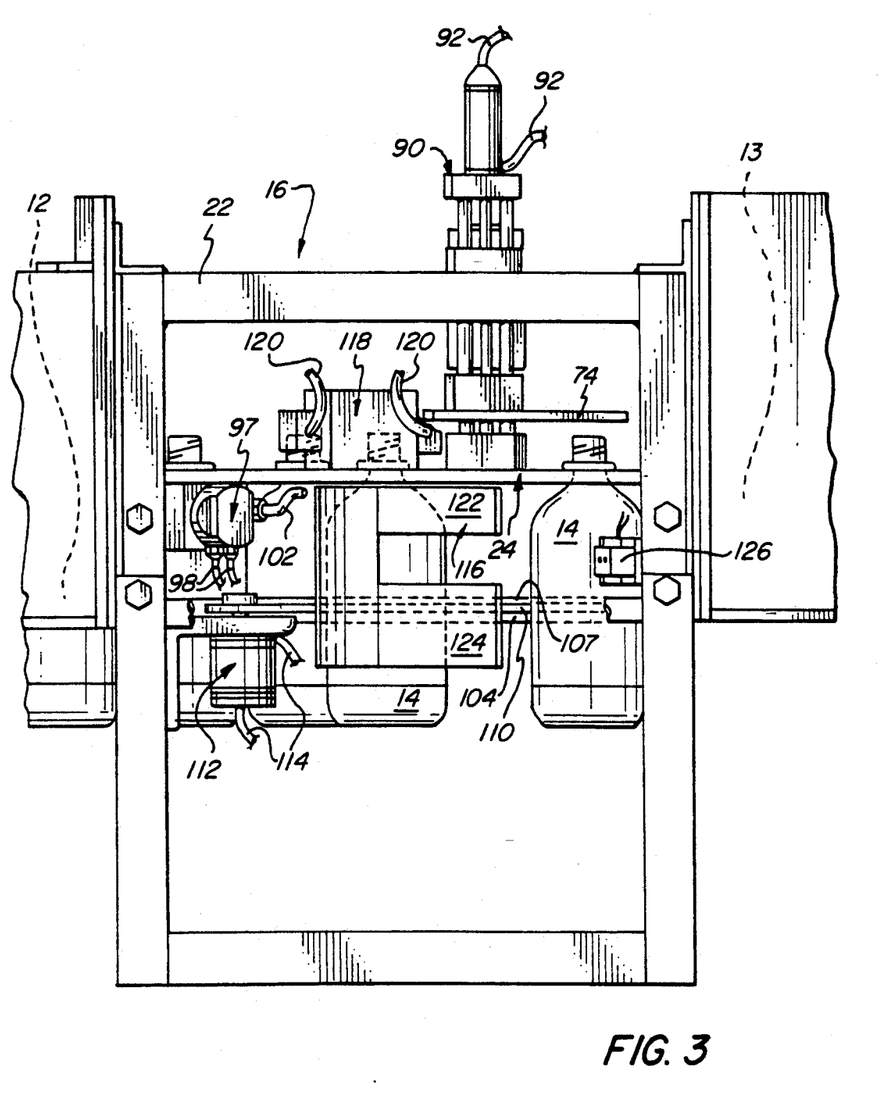
FIG. 3 is a side elevation view of the line changing system of FIG. 1.

Prior to conveyor line changeover, i.e., alternation of changing plates 72, 74 between positions A and B, intersection 16 must be clear of any bottles at least in the region of opening 70 near intersection 68 of bottle paths P4, P5. Referring to FIGS. 1, 3 and 4 illustrating the configuration of apparatus 10 as a combiner for combining infeed conveyor lines 11 and 12 into a single downstream conveyor line 13, momentary stops 94, 96 are arranged and are actuable by rod and cylinder assemblies 97 or the like to stop articles from moving across transfer plate 24 along curving paths P4, P5. Momentary stops 94, 96 may be manually operated, but are preferably automatically operated by a controller (not shown in any Figure) through fluid lines 98 or the like. The extended position (stop 94 in FIGS. 1 and 4) of momentary stops 94, 96 blocks passage of bottles so that changing plates 72, 74 need not bear the additional force of stopping bottles which may lead to wear and/or alignment problems. Momentary stops 94, 96 permit the position of changing plates 72, 74 to be alternated without contacting bottles 14.

Momentary stops 94, 96 preferably have wedge-shaped tips 100 so that as they are extended bottles are urged slightly upstream or slightly downstream to prevent damage to or jamming of bottles.

Momentary stops 94, 96 and changing plates 72, 74 are preferably located in the region of transfer plate 24 and not in the region of plenums 18 to prevent frictional, lubricant and the like contaminants of these moving parts from being blown into bottles 14. In the absence of a plenum, bottles 14 are moved through intersection 16 over transfer plate 24 substantially completely by line pressure. Thus, a fluid line 102 (FIG. 3 only) or the like is needed to insure that bottles 14 just downstream of momentary stops 94, 96 in their extended positions clear intersection 68 of curving bottle paths P4, P5 before the changing plates are moved between positions A and B. Generally, a device such as fluid line 102 (only one shown) is necessary downstream of each conveyor line including a stop or each infeed conveyor line since line pressure can not move bottles once the stop is extended. Air lines 102 may be automatically switched by a controller (not shown in any Figure), manually switched or operated substantially continuously.

In addition to momentary stops 94, 96, intersection 16 also includes accumulation stops 114, 116 mounted adjacent transfer plate 24 just downstream of momentary stops 94, 96 and movable between an extended position substantially perpendicular to curving paths P4, P5 (accumulation stop 114 in FIG. 4) and a retracted position clear of bottles 14 as they are conveyed along curving paths P4, P5 (accumulation stop 116 in FIGS. 1 and 4). Accumulation stops 114, 116 are connected to rotary actuators 118 which may be manually operated, but are preferably automatically operated by a controller (not shown in any Figure) through fluid lines 120 or the like. Momentary stops 94, 96 are designed to interrupt the flow of bottles along curving paths P4, P5 as they are moved to their extended position. Accumulation stops 114, 116, however, are designed to be moved to their extended position while curving paths P4, P5 are free of articles, and are designed to hold and release an accumulation of articles which forms when upstream momentary stops 94, 96 are retracted.

Accumulation stops 114, 116 include pairs of fingers 122, 124 which stop bottles 14 in a substantially upright configuration relative to transfer plate 24 and similarly release accumulated bottles downstream in a substantially upright (vertical as illustrated) configuration to prevent jamming. It is understood that the size and shape of fingers 122, 124 may be adjusted as necessary to stop and hold various bottles in a substantially vertical configuration.

Bottle body guides 104 are provided to prevent bottles 14 from rocking and tipping as they are advanced along conveyor lines 11, 12, 13 and across intersection 16 which may damage bottles as well as jam machines. Body guides 104 are mounted to frame 22 with brackets 106 (FIG. 2 only).

Referring to FIGS. 7A, 7B, 7C and 7D, operation of conveyor line changing apparatus 10 configured as illustrated to function as a combiner may be described. The operation depicted is a changeover from conveyor line 11 to line 12, however, it is understood that similar steps may be used to change from line 12 to 11.

Figure 7A:
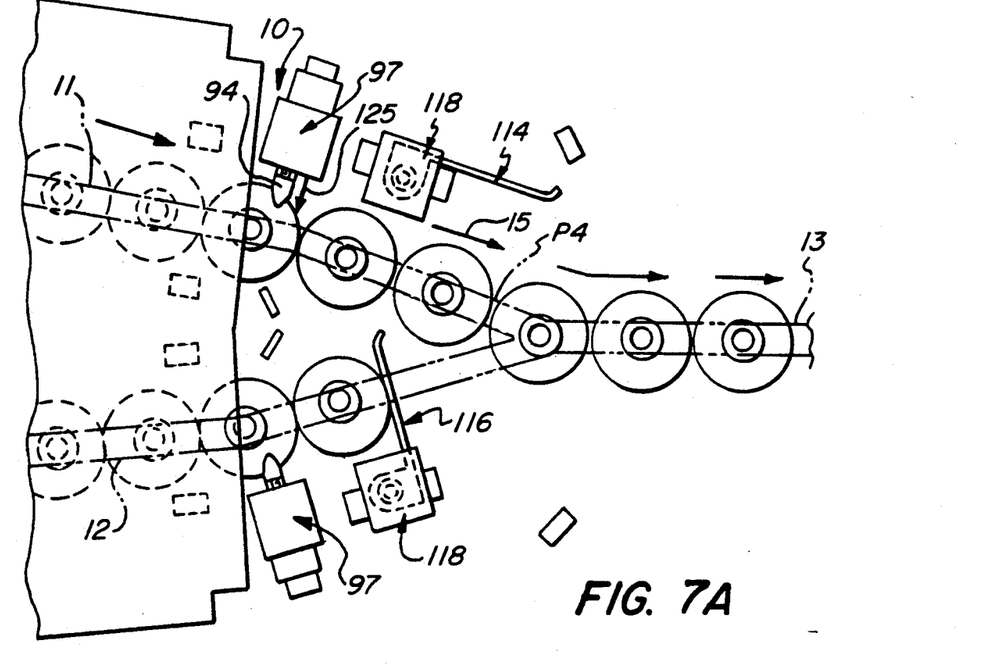
FIGS. 7A, 7B, 7C and 7D are schematic top plan views illustrating operation of the line changing system of FIG. 1.

Beginning with FIG. 7A, accumulation stop 116 is extended, and stops 94, 96 and 114 are retracted. Then with plate 74 in aligned position A and plate 72 in clear position B (see FIG. 2), bottles 14 are free to move substantially by line pressure only along path P4 in the direction of arrows 15 between conveyor lines 11 and 13. The line changeover is initiated by extending momentary stop 94 as indicated by arrow 125 to interrupt bottles 14 moving downstream along path P4.

Figure 7B:
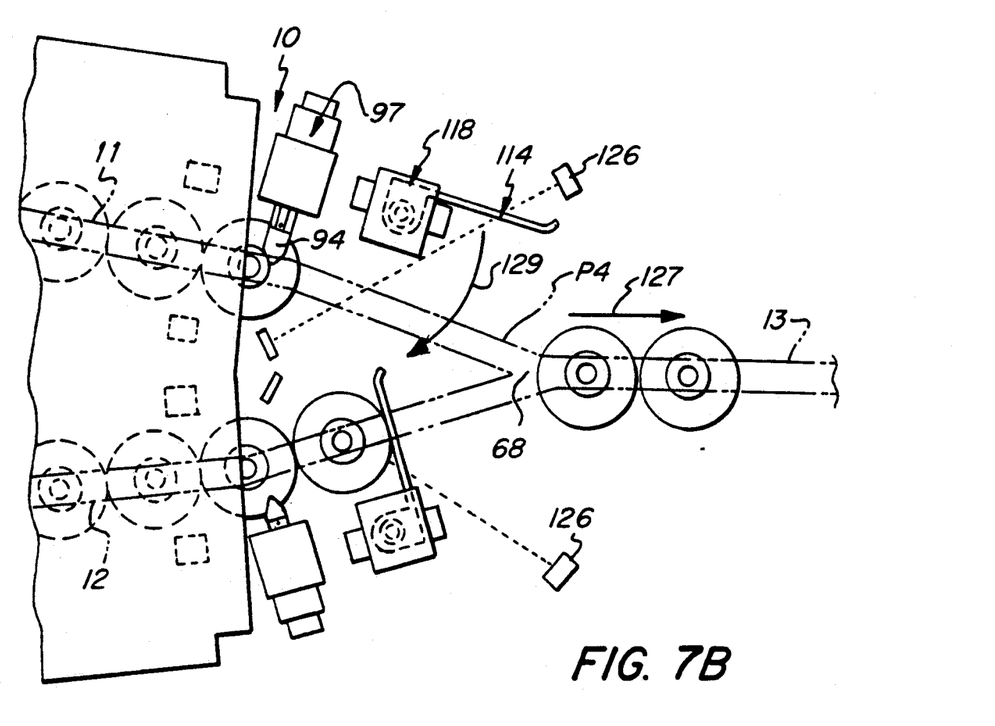

Referring now to FIG. 7B, fluid line 102 or like means (see FIG. 3) moves any bottles 14 lying just downstream of momentary stop 94 through intersection 16 and onto conveyor line 13 as indicated by arrow 127. One or more sensors 126 may be provided in the region of bottle path intersection 68 and changing plates 72, 74 to insure no bottles are present in or moving through the intersection prior to line changeover. Once the intersection is clear, accumulation stop 114 is rotated into place across path P4 as indicated by arrow 129 and the positions of changing plates 72, 74 are alternated so that plate 74 is placed in clear position B and plate 72 is placed in aligned position A (see FIG. 2).

Figure 7C:
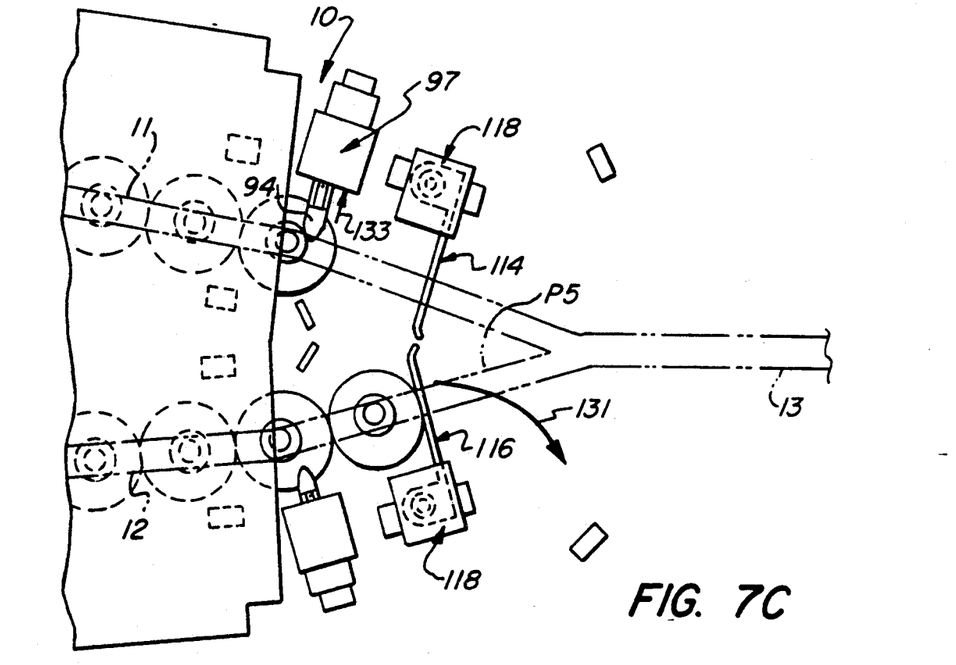
Figure 7D:
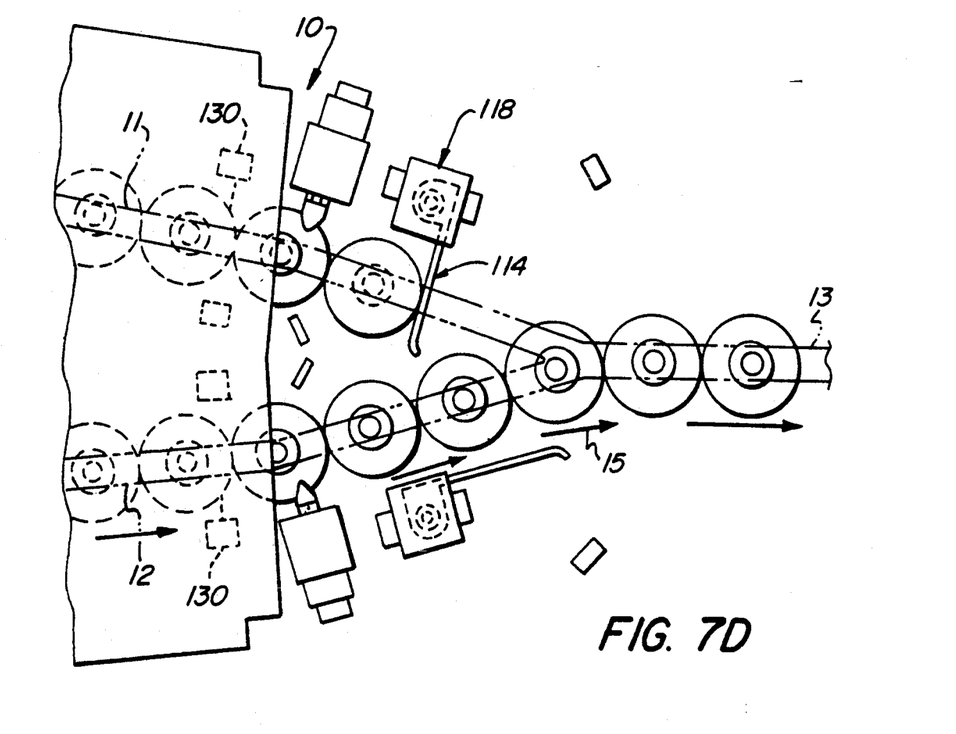

Now, referring to FIG. 7C, accumulation stop 116 is rotated open as indicated by arrow 131 and bottles 14 are then free to move substantially by line pressure only along path P5 between conveyor lines 12 and 13 as indicated by arrows 15 in FIG. 7D.

Returning to FIG. 7C, momentary stop 94 may be retracted, as indicated by arrow 133, any time after extension of accumulation stop 114, but preferably is retracted a predetermined time thereafter. Retraction of momentary stop 94 permits articles from conveyor line 11 to accumulate behind accumulation stop 114 prior to line changeover.

Initiation of line changeover can be manually or automatically controlled (by a controller not shown in any Figure). In this regard, sensors 130 may be employed on infeed conveyor line(s) (11 and 12 when configured as illustrated) for example to detect an accumulation of articles on the stopped line or path, and a lack of articles moving along the open line or path.

It is understood that conveyor line changing apparatus 10 may be reconfigured with virtually the same components to function as a separator in which bottles move through intersection 16 in a direction opposite arrows 15. To use apparatus 10 as a separator, stops 94, 96, 114 and 116 are unnecessary since conveyor lines 11, 12 are downstream lines, but a momentary and an accumulation stop must be provided on the infeed line 13. A fluid line similar to 102 or like means must also be provided for moving bottles downstream of the stop through intersection 16 to the downstream lines. Changing plates 72, 74 would operate in substantially the same manner and would be alternated upon an indication that bottle path intersection 68 was clear. Sensors 130 on bottle paths P4 and P5 could be used to determine whether bottles were moving along or backed up on the bottle path and thus could indicate a lane changeover.

Especially when apparatus 10 is used as a separator, but also when apparatus 10 is used as a combiner, an additional component comprising a bottle body diverter 107 is also provided. Diverter 107 includes diverting edges 108, 110 and is movable by an actuator 112 between a first position (illustrated in FIG. 1) in which edge 110 guides bottle 14 body portions along bottle path P5 and a second position (not illustrated in which edge 108 guides bottle 14 body portions along a bottle path P4. Diverter 107 may be manually moved or automatically moved by a controller (not shown in any Figure) via lines 114. Diverter 107 should be moved when bottle path intersection is clear, and can conveniently be moved when changing plates 72, 74 are alternated.

During operation of apparatus 10 in separator configuration, diverter 107 prevents the situation in which neck 52 of bottle 14 attempts to follow one of bottle paths P4, P5 while the bottle body attempts to follow the other of the bottle paths. Such a situation can cause bottle damage and machine jamming. During operation of apparatus 10 in combiner configuration, the diverter helps to smooth transfer of bottles 14 through intersection 16 for passage at relatively high speeds between the conveyor lines, and reduces machine jamming by preventing rocking and tipping of articles as they are conveyed through intersection 16.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A line changing apparatus for bottle conveyors comprising:

first, second and third conveyor lines having a pair of neck guides for supporting bottles beneath their neck rings, said first and second conveyor lines following first and second conveyor paths arranged at an angle of between about 20 and 60 degrees apart, the third conveyor line following a third conveyor path arranged substantially parallel to a line substantially bisecting the angle between said first and second paths;

a transfer plate intersection for connecting said conveyor lines together, said transfer plate having a first end for receiving and mounting said first and second conveyor lines and having a second end for receiving and mounting said third conveyor line, said transfer plate having first and second substantially continuously curving bottle paths and having first and second neck guides for partially supporting bottles beneath their neck rings, said conveyor lines mounted to the transfer plate so that said first curving neck guide connects between one of the neck guides on said third conveyor line and one of the neck guides on said first conveyor line and so that said second curving neck guide connects between the other of the neck guides on said third conveyor line and one of the neck guides on said second conveyor line; and a pair of neck guide portions for supporting bottles beneath their neck rings, said neck guide portions movable between a first vertical position substantially in planar alignment with said transfer plate intersection and a second vertical position clear of the bottle paths, one said neck guide portion extending from said first curving neck guide toward the other of the neck guides on said second conveyor line and the other said neck guide portion extending from said second curving neck guide toward the other of the neck guides on said first conveyor line when said neck guide portions are in said first vertical position, said neck guide portions substantially continuously curving, said one neck guide portion following substantially along said second bottle path and said other neck guide portion following substantially along said first bottle path for smoothly guiding bottles between said third conveyor line and said first and second conveyor lines substantially completely with line pressure.

2. The line changing apparatus according to claim 1 wherein said transfer plate intersection further comprises third and fourth substantially continuously curving neck guides, said third curving neck guide spaced apart from said first curving neck guide and following along said first bottle path, said fourth curving neck guide spaced apart from said second curving neck guide and following along said second bottle path, said third and fourth curving neck guides meeting in a point near an intersection of said first and second bottle paths, said third curving neck guide extending from said point to said other neck guide on said first conveyor line, said fourth curving neck guide extending from said point to said other neck guide on said second conveyor line.

3. The line changing apparatus according to claim 2 wherein said one neck guide portion spans said first bottle path from said first curving neck guide to said point, and wherein said other neck guide portion spans said second bottle path from said second curving neck guide to said point.

4. The line changing apparatus according to claim 1 wherein said first and second curving neck guides of said transfer plate intersection have bevelled edges to reduce friction with bottle neck rings.

5. The line changing apparatus according to claim 4 wherein said third and fourth curving neck guides of said transfer plate intersection have bevelled edges to reduce friction with bottle neck rings.

6. The line changing apparatus according to claim 5 wherein said pair of neck guide portions have bevelled edges to reduce friction with bottle neck rings.

7. The line changing apparatus according to claim 1 including means for guiding a body portion of bottles through said transfer plate intersection along said first and second bottle paths.

8. The line changing apparatus according to claim 1 including means for clearing said transfer plate intersection of bottles prior to alternating said neck guide portions between said first and second vertical positions.

9. The line changing apparatus according to claim 1 including a first plenum chamber for moving bottles along said third conveyor line at a first line speed, and a second plenum chamber for moving bottles along said first and second conveyor lines at a second line speed equal to about one-half times the first line speed.

10. The line changing apparatus according to claim 1 including means for interrupting a flow of bottles along at least one of the curving bottle paths.

11. The line changing apparatus according to claim 10 including means for accumulating interrupted articles with a substantially vertical configuration to prevent jamming.

12. A bottle conveyor line intersection comprising:
a transfer plate having a substantially Y-shaped opening including first and second arm members and a leg member extending to edges of said transfer plate, defining a central plate, and defining first and second side plates; said first side plate having a first edge bounding said substantially Y-shaped opening along one side of said first arm member and along one side of said leg member, said first edge lying substantially parallel to a first bottle path; said second side plate having a first edge bounding said substantially Y-shaped opening along one side of said second arm member and along the other side of said leg member, said first edge lying substantially parallel to a second bottle path; said central plate having first and second converging edges bounding said substantially Y-shaped opening along other sides of said first and second arm members, said first edge lying substantially parallel to said first bottle path and said second edge lying substantially parallel to said second bottle path; said first edges of said first and second side plates and said converging edges of said central plate for supporting bottles moving along said first and second bottle paths beneath their neck rings; said first edges of said first and second side plates substantially continuously curving between said first and second arm members, and said leg member to smoothly guide bottles through said intersection across said transfer plate.

13. The bottle conveyor line intersection according to claim 12 including a first changing plate movable between a first position for aiding bottles to move along said first bottle path and a second position permitting bottles to be moved along said second bottle path.

14. The bottle conveyor line intersection according to claim 12 including a second changing plate movable between a first position for aiding bottles to move along said second bottle path and a second position permitting bottles to be moved along said first bottle path.

15. The bottle conveyor line intersection according to claim 12 including at least one fluid conduit mounted beneath said transfer plate for directing fluid in a direction along at least one of said bottle paths to clear said intersection of bottles prior to alternating said first and second changing plates between said first and second positions.

16. The bottle conveyor line intersection according to claim 12 including a wedge-shaped stop for interrupting articles moving along one of the bottle paths.

17. The bottle conveyor line intersection according to claim 16 including fingers for accumulating articles with a substantially upright configuration.

18. A line changing apparatus for bottle conveyors comprising:
first, second and third conveyor lines having a pair of neck guides for supporting bottles beneath their neck rings;
a transfer plate intersection for connecting said conveyor lines together, said transfer plate having a first end for receiving and mounting said first and second conveyor lines and having a second end for receiving and mounting said third conveyor line, said transfer plate having first and second substantially continuously curving bottle paths and having first and second neck guides for partially supporting bottles beneath their neck rings; said conveyor lines mounted to the transfer plate so that said first neck guide connects between one of the neck guides on said third conveyor line and one of the neck guides on said first conveyor line and so that said second neck guide connects between the other of the neck guides on said third conveyor line and one of the neck guides on said second conveyor line; and a pair of neck guide portions for supporting bottles beneath their neck rings, said neck guide portions movable between a first position aligned with said transfer plate intersection and a second position clear of the bottles, one said neck guide portion following substantially along said second curving bottle path and extending from said first neck guide toward the other of the neck guides on said second conveyor line and the other said neck guide portion following substantially along said first curving bottle path and extending from said second neck guide toward the other of the neck guides on said first conveyor line when said neck guide portions are in said first position for smoothly guiding bottles through said intersection substantially completely with line pressure.

19. The bottle conveyor line intersection according to claim 18 including a first plenum chamber for moving bottles along one of the conveyor lines at a first speed, and a second plenum chamber for moving bottles along at least one of the conveyor lines at a second speed, the first speed greater than the second speed.

20. The line changing apparatus according to claim 18 wherein said transfer plate intersection further comprises third and fourth neck guides meeting in a point near an intersection of said first and second bottle paths, said third curving neck guide spaced apart from said first curving neck guide and following along said first curving bottle path and extending from said point to said other neck guide on said first conveyor line, and said fourth neck guide spaced apart from said second neck guide and following along said second curving bottle path, and extending from said point to said other neck guide on said second conveyor line.

21. The line changing apparatus according to claim 20 wherein said one neck guide portion spans said first bottle path from said first neck guide to said point, and wherein said other neck guide portion spans said second bottle path from said second neck guide to said point.

22. The line changing apparatus according to claim 18 wherein said first and second neck guides of said transfer plate intersection have bevelled edges to reduce friction with bottle neck rings.

23. The line changing apparatus according to claim 18 including means for accumulating bottles along one of the curving bottle paths.

24. The line changing apparatus according to claim 23 wherein said accumulating means comprises means for interrupting movement of bottles along the one curving bottle path.

* * * * *